US010908261B2

(12) United States Patent
Fails et al.

(10) Patent No.: US 10,908,261 B2
(45) Date of Patent: Feb. 2, 2021

(54) TARGET IDENTIFICATION AND CLUTTER MITIGATION IN HIGH RESOLUTION RADAR SYSTEMS

(71) Applicant: Vadum, Inc., Raleigh, NC (US)

(72) Inventors: Eric Brandon Fails, Durham, NC (US); Roger Lewis Boyer, Raleigh, NC (US); Aaron Lael Walker, Durham, NC (US); Jennings Gary Edge, Durham, NC (US)

(73) Assignee: Vadum, Inc., Raleigh, NC (US)

( * ) Notice: Subject to any disclaimer, the term of this patent is extended or adjusted under 35 U.S.C. 154(b) by 195 days.

(21) Appl. No.: 16/183,372

(22) Filed: Nov. 7, 2018

(65) Prior Publication Data

US 2019/0137604 A1 May 9, 2019

Related U.S. Application Data

(60) Provisional application No. 62/583,744, filed on Nov. 9, 2017.

(51) Int. Cl.
| | |
|---|---|
| *G01S 7/41* | (2006.01) |
| *G01S 13/72* | (2006.01) |
| *G01S 13/58* | (2006.01) |
| *G01S 13/88* | (2006.01) |
| *G01S 7/292* | (2006.01) |
| *G01S 13/42* | (2006.01) |

(52) U.S. Cl.
CPC .............. *G01S 7/414* (2013.01); *G01S 7/412* (2013.01); *G01S 7/415* (2013.01); *G01S 13/582* (2013.01); *G01S 13/723* (2013.01); *G01S 13/726* (2013.01); *G01S 13/88* (2013.01); *G01S 7/292* (2013.01); *G01S 7/417* (2013.01); *G01S 13/426* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,539,412 | A * | 7/1996 | Mendelson | G01R 23/16 324/76.19 |
| 9,268,008 | B1 * | 2/2016 | Abileah | G01S 7/022 |
| 2007/0024494 | A1 * | 2/2007 | Dizaji | G01S 13/723 342/90 |
| 2010/0026559 | A1 * | 2/2010 | Siegel | G01S 7/414 342/159 |
| 2013/0137961 | A1 * | 5/2013 | Barnes | A61B 5/0075 600/407 |
| 2014/0043185 | A1 * | 2/2014 | Quellec | G01S 7/2926 342/146 |

(Continued)

*Primary Examiner* — Mamadou L Diallo
(74) *Attorney, Agent, or Firm* — Murphy, Bilak & Homiller, PLLC

(57) ABSTRACT

A signal processing system includes a random decision forests-based bulk filter. The signal processing system further includes one or more sensors (e.g., radar systems, satellite systems) that interface with the signal processing system via a radio frequency (RF), electro-optical (EO) or infrared (IR) exchange process, a computationally inexpensive object detector, a computationally inexpensive state estimator, then the random decision forests-based bulk filter, a computationally expensive object tracker, a computationally expensive object discriminator, and a report. Further, the random decision forests-based bulk filter features a filter training optimization process.

16 Claims, 17 Drawing Sheets

(56) References Cited

U.S. PATENT DOCUMENTS

2016/0170019 A1\* 6/2016 Owirka ............... G01S 13/5242
                                                    342/25 B
2018/0052224 A1\* 2/2018 Bretschneider ......... G01S 13/90
2018/0141562 A1\* 5/2018 Singhal ................ G05D 1/0276

\* cited by examiner

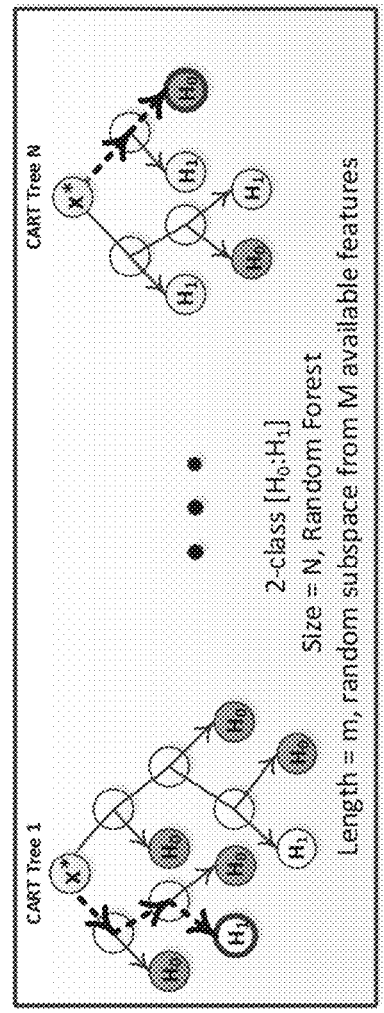
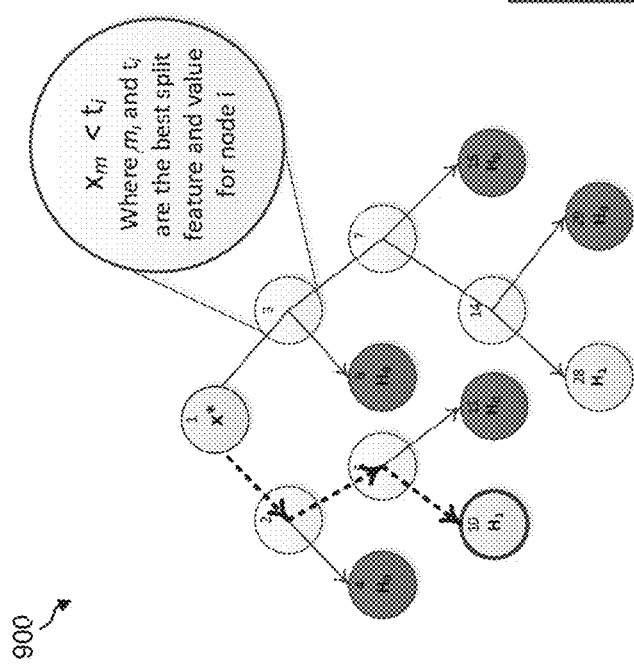
*FIG. 9A*
*FIG. 9B*

| Parameter/Setting | Design Step | Description |
|---|---|---|
| $N$ | Training | Number of CART trees in a Random Forest |
| $m$ | Training | CART tree random subspace dimensionality |
| $\Delta t_{tr}$ | Training | Object training time resolution |
| $r$ | Training | Bootstrap ratio |
| $\lambda_0$ | Training | Class 0 boosting factor (clutter) |
| $\lambda_1$ | Training | Class 1 boosting factor (targets of interest) |
| $\Delta t_{eo}$ | Operation | Object evaluation/operation time resolution |
| $PD_{min}$ | Evaluation | Minimum probability of target of interest detection |
| $\gamma_T$ | Operation | Decision Fusion Time Threshold |
| $numObs$* | Operation | Number of Fusion Observations |
| $\gamma_{DS}$ | Operation | Decision Fusion Statistic Threshold |

* $\gamma_T = numObs \times \Delta t_{eo}$

FIG. 10

| time | Object ID | ds | Object ID | ds |
|---|---|---|---|---|
| 0 | 27 | 0.184 | 35 | NA |
| 0.1 | 27 | 0.258 | 35 | NA |
| 0.2 | 27 | 0.282 | 35 | NA |
| 0.3 | 27 | 0.232 | 35 | 0.654 |
| 0.4 | 27 | 0.227 | 35 | 0.610 |
| 0.5 | 27 | 0.147 | 35 | 0.560 |
| 0.6 | 27 | 0.287 | 35 | 0.670 |
| 0.7 | 27 | 0.181 | 35 | 0.691 |
| 0.8 | 27 | NA | 35 | 0.573 |
| 0.9 | 27 | NA | 35 | 0.680 |
| 1 | 27 | NA | 35 | 0.605 |

FIG. 15

| time | Object ID | ds | DS | H | Object ID | ds | DS | H |
|---|---|---|---|---|---|---|---|---|
| 0 | 27 | 0.252 | 0.252 | NA | 35 | NA | NA | NA |
| 0.1 | 27 | 0.284 | 0.268 | NA | 35 | NA | NA | NA |
| 0.2 | 27 | 0.175 | 0.237 | NA | 35 | NA | NA | NA |
| 0.3 | 27 | 0.206 | 0.229 | NA | 35 | 0.541 | 0.541 | NA |
| 0.4 | 27 | 0.238 | 0.231 | 0 | 35 | 0.669 | 0.605 | NA |
| 0.5 | 27 | 0.238 | 0.231 | 0 | 35 | 0.646 | 0.619 | NA |
| 0.6 | 27 | 0.238 | 0.231 | 0 | 35 | 0.541 | 0.599 | NA |
| 0.7 | 27 | 0.238 | 0.231 | 0 | 35 | 0.524 | 0.584 | 1 |
| 0.8 | 27 | NA | NA | 0 | 35 | 0.524 | 0.584 | 1 |
| 0.9 | 27 | NA | NA | 0 | 35 | 0.524 | 0.584 | 1 |
| 1 | 27 | NA | NA | 0 | 35 | 0.524 | 0.584 | 1 |

FIG. 17

TARGET IDENTIFICATION AND CLUTTER MITIGATION IN HIGH RESOLUTION RADAR SYSTEMS

TECHNICAL FIELD

The presently disclosure relates generally to filtering radar return signals and more particularly to the use of classification and regression tree (CART) ensembles to aid in high-resolution radar target identification and clutter rejection.

BACKGROUND

High-resolution radar systems produce a large number of returns both from targets of interest as well as clutter objects within the radar's scene. The large number of returns burdens the signal/data processing and tracking subsystems in the radar. Reliance on single-feature criteria (e.g., speed or radar cross-section) for resolving targets of interest from clutter is often insufficient or ineffective for allowing the radar to focus resources on tracking only targets of interest.

High-power, high-resolution radars can observe and track objects as small as centimeters, at ranges of hundreds of kilometers. As electronic components become more capable, the ability to resolve yet still smaller objects at longer ranges will improve. Therefore, certain challenges exist with respect to radar systems. For example, (1) large numbers of clutter objects (on the order of thousands) challenge computational resources, (2) clutter objects may occlude targets of interest, (3) predictive tracking algorithms can create spurious results ("phantom tracks"), and (4) finite radar system resources exist for managing tracked objects and effectively communicating attributes of targets of interest to systems supported by the radar.

BRIEF DESCRIPTION OF THE DRAWINGS

The features and advantages of the present invention will be more clearly understood from the following description taken in conjunction with the accompanying drawings, which are not necessarily drawn to scale, and wherein:

FIG. 8, FIG. 9A, and FIG. 9B show more details of the algorithm that is the basis of the presently disclosed bulk filter application;

FIG. 10 shows a table of an example of the learning parameters and operational settings of the presently disclosed bulk filter application;

FIG. 15 shows a table of an example of the soft decision mode output;

FIG. 17 shows a table of an example of the hard decision mode output;

DETAILED DESCRIPTION OF EXEMPLARY EMBODIMENTS

Figure 1:
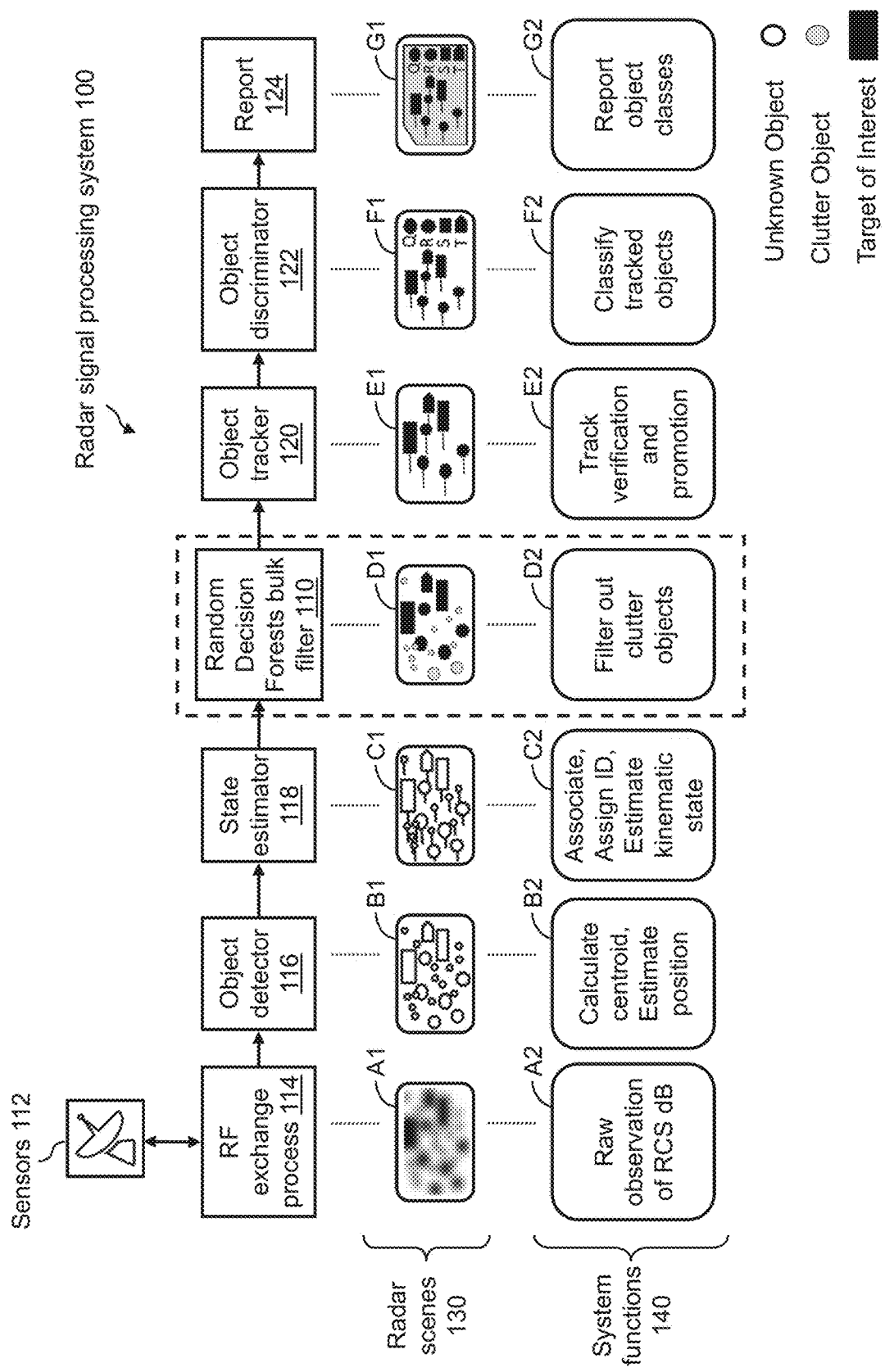
FIG. 1 illustrates a block diagram of an example of a signal processing system that includes the presently disclosed bulk filter application for resolving targets of interest from clutter objects in high-resolution radar systems.

The present disclosure describes particular uses for classification and regression trees (CARTS), and in particular the use of CART ensembles for filtering and classification, where the term CART ensemble means that multiple CARTs are used in the filtering and classification process. One important category of techniques uses bootstrap aggregated (or bagged) decision trees, with a technique known as random forest classification or random decision forests classification being a specific type of bootstrap aggregated decision trees. The term RANDOM FORESTS is a trademark of Minitab, Inc., for statistical analysis software, so the terms "random decision forests" and "random decision forests classification" are used herein to refer to ensemble learning methods used for classification, regression, and other tasks and that involve the construction of several decision trees at training time and outputting the class that is the mode of the classes for classification, e.g., as developed by Tin Kam Ho, of which the specific techniques developed by Leo Breiman and Adele Cutler are important examples.

In the discussion that follows, techniques are described that employ random decision forests classification. It will be appreciated however, that at least some of the described techniques may employ bootstrap aggregated CARTs, and some may likewise use CARTs, more generally. Thus, it should be understood that references to random decision forests and random decision forests classification herein should be understood to include but are not limited to the specific techniques developed by Breiman and Cutler and widely known as "random forests." It should further be understood that these references to random decision forests and random decision forests classification, unless the specific context indicates otherwise, may be replaced with the more general terms CART ensembles or CART ensemble classification.

As noted above, the very large number of returns in high-power and/or high-resolution radar systems burdens the signal/data processing and tracking subsystems in the radar. Reliance on single-feature criteria (e.g., speed or radar cross-section) for resolving targets of interest from clutter is often insufficient or ineffective for allowing the radar to focus resources on tracking only targets of interest. Multi-dimensional approaches that take into account several features have the potential to improve over these approaches by looking for patterns of feature values that uniquely distinguish the threatening objects from clutter.

One particular category of a multi-dimensional approach is the use of random decision forests classification or, more generally, bootstrap aggregated CART ensemble classification or, even more generally, CART ensemble classification. Thus, in some embodiments, the presently disclosed techniques utilize a random decision forests bulk filter application for identification of targets of interest and clutter object rejection. Namely, a signal processing system is provided that includes a random decision forests-based bulk filter, which is a bulk filter for clutter. The signal processing system further includes one or more sensors (e.g., radar systems, satellite systems) that communicate with the signal processing system via a radio frequency (RF) exchange process, a computationally inexpensive object detector, a computationally inexpensive state estimator, then the random decision forests-based bulk filter, a computationally expensive object tracker, a computationally expensive object discriminator, and a report. In the context of the signal processing system and the random decision forests-based bulk filter disclosed herein, the term "inexpensive" means computationally inexpensive or requiring low computing resources, also referred to as low-cost signal processing. Further, the "expensive" means computationally expensive or requiring high computing resources, also referred to as high-cost signal processing.

An aspect of the presently disclosed signal processing system and random decision forests-based bulk filter is that it can be used to reject clutter objects observed by a high-resolution radar systems while reporting targets of interest.

Another aspect of the presently disclosed signal processing system and random decision forests-based bulk filter is that it operates in real time by providing a set of object filtering output decisions before the next set of object records are provided as input to the random decision forests filter.

Yet another aspect of the presently disclosed signal processing system and random decision forests-based filter is that it improves (as compared with conventional systems) the efficiency, response and reliability of high-resolution radar systems by eliminating unnecessary processing and application of resources to clutter objects.

Yet another aspect of the presently disclosed signal processing system and random decision forests-based bulk filter is that it features a filter training optimization process.

Yet another aspect of the presently disclosed signal processing system and random decision forests-based bulk filter is the use of the random decision forests approach for filtering in high resolution radar applications. Namely, the use of the random decision forests approach along with a priori data (i.e., reference data) for filtering in high resolution radar applications.

Still another aspect of the presently disclosed signal processing system and random decision forests-based bulk filter is that it is agnostic to the features that are available from certain sensors (e.g., radar systems, satellite systems). However, in one example, the minimum features processed by the random decision forests-based bulk filter are (1) object velocity, (2) object acceleration, (3) object radar cross section (RCS), and (4) object altitude.

FIG. 1 is a block diagram of a signal processing system 100 that is an example application of a random decision forests bulk filter for identification of targets of interest and clutter object rejection. For example, signal processing system 100 includes a random decision forests bulk filter 110, wherein the random decision forests bulk filter 110 is accompanied by a filter training optimization process. In some particular embodiments, the random decision forests bulk filter 110 is based on the random decision forests approach introduced by Leo Breiman of UC-Berkeley.

The random decision forests bulk filter 110 of signal processing system 100 is a filter that (1) rejects clutter objects observed by a high-resolution radar system while reporting targets of interest; (2) operates in real time and (3) it proves (as compared with conventional systems) the overall efficiency, response time, and reliability of the high-resolution radar system by eliminating unnecessary processing and application of resources due to uninteresting clutter objects.

The signal processing system 100 includes one or more sensors 112. The sensors 112 can include any type of fixed or transportable, land-based or sea-based radar system and/ or any type of space tracking and surveillance system (e.g., satellite-based surveillance systems). A radar signal processing system 100 further includes an RF exchange process 114, an object detector 116, a state estimator 118, an object tracker 120, an object discriminator 122, and a reporting process 124. Within the RE exchange process 114, information is passed from the one r more sensors 112 to object detector 116, then to the state estimator 118, then to the presently disclosed random decision forests bulk filter 110, then to the object tracker 120, then to the object discriminator 122, then object identifications are reported 124 to other sensors and/or command centers. Any one or more of RE exchange process 114, object detector 116, state estimator the random decision forests bulk filter 110, object tracker 120, and object discriminator 122 may be implemented with one or more microprocessors, digital signal processors, or like, programmed with appropriate program instructions stored in associated memory. The processing corresponding to any one of these functional units may be carried out within a single processor or distributed among several processors. Some of the functionality of these functional units may instead or also be implemented using digital logic and/or hardcoded processing elements such as field-programmable gate arrays (FPGAs) in some embodiments.

The arrangement of sensors 112, RE exchange process 114, object detector 116, state estimator 118, the random decision forests bulk filter 110, object tracker 120, and object discriminator 122 can be considered the "radar signal processing chain" of signal processing system 100. The sensors 112, RF exchange process 114, object detector 116, and state estimator 118 are considered the computationally inexpensive portion f the radar signal processing chain, whereas the object tracker 120 and object discriminator 122 are considered the computationally expensive portion of the radar signal processing chain. It is the function of the presently disclosed random decision forests bulk filter 110 to filter out the clutter objects and pass the target of interest objects only to the computationally expensive portion of the radar signal processing chain.

FIG. 1 also shows a set of radar scenes 130 and a set of system functions 140 that correlate to the various components of signal processing system 100. Radar scenes 130 show pictorially examples of clutter and target of interest objects being processed through the radar signal processing chain of signal processing system 100, wherein clutter objects are depicted in grey and targets of interest are depicted in black. (shapes indicate priority level for subsequent processing). Namely, a panel A1 of radar scenes 130 and a panel A2 of system functions 140 correlate to RF exchange process 114. A panel B1 of radar scenes 130 and a panel B2 of system functions 140 correlate to object detector 116. A panel C1 of radar scenes 130 and a panel C2 of system functions 140 correlate to state estimator 118. A panel D1 of radar scenes 130 and a panel D2 of system functions 140 correlate to the random decision forests bulk filter 110. A panel E1 of radar scenes 130 and a panel E2 of system functions 140 correlate to object tracker 120. A panel F1 of radar scenes 130 and a panel F2 of system functions 140 correlate to object discriminator 122. A panel G1 of radar scenes 130 and a panel G2 of system functions 140 correlate to report 124.

In signal processing system 100, during the RF exchange process 114, objects within the radar field of view reflect incident radar pulses. The degree of reflection is measured by radar cross section (RCS) in units of decibel square meters (dBsm). Object detector 116 is an object detection module that identifies solid objects from noisy responses and associates an object centroid location with a current position.

Using state estimator 118, these unknown objects are associated from observation to observation and assigning an object ID. The state estimator 118 can use state space models to estimate kinematic features such as position, current speed, acceleration and heading. Object detector 116 and state estimator 118 are examples of low-cost signal processing. With respect to RF exchange process 114, object detector 116, and state estimator 118, all objects are recorded without regard to the nature of the object (all shown as blurred images in panel A1 and as white with black outline in panels B1, and C1).

As the objects are observed over time, they are presented to the presently disclosed random decision forests bulk filter 110, wherein the random decision forests bulk filter 110 identifies which objects are targets of interest (shown in black) and which objects are clutter (shown in grey). Targets of interest are passed along to object tracker 120, while clutter objects are rejected. Ideally, the targets of interest only are passed to the expensive tracking module (e.g., object tracker 120). Object discriminator 122, present in some high-resolution radars, determines what type of object is being observed. At object discriminator 122, a more detailed identification of the nature of the target of interest objects are determined, such as type Q, type R type S or type T. Once objects are identified and possibly ranked for priority they are reported to systems supported by the radar. Object tracker 120 and object discriminator 122 are examples of high-cost signal processing.

Prior to the bulk filter step, it is common to expect many thousands of uninteresting objects to exist in the radar's database queue. The goal of the bulk filter is to eliminate as many of the clutter objects as possible without rejecting targets of interest.

Accordingly, the random decision forests bulk filter 110 of signal processing system 100 provides a mechanism for clutter rejection for sensors engaged in target identification applications. The random decision forests bulk filter 110 removes clutter objects from the signal processing chain, thus reducing computational burden on the radar and allowing efficient allocation of resources in response to objects of interest.

Figure 2:
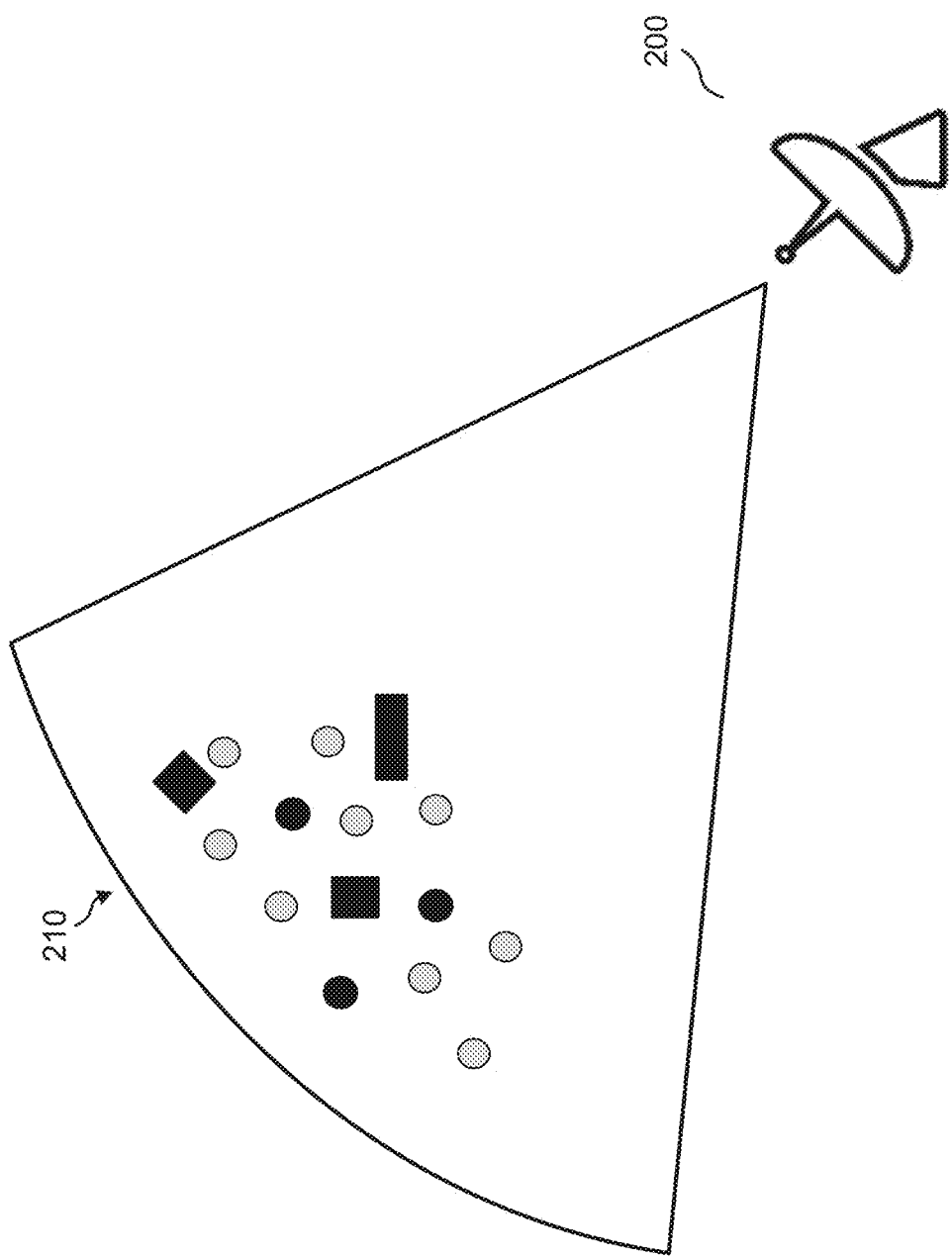
FIG. 2 shows an example of clutter objects and targets of interest within the radar field of view.

FIG. 2 illustrates an example of a radar sensor field of view. FIG. 2 shows a radar system 200 that has a certain radar field of view 210. In this example, the purpose of the random decision forests bulk filter 110 of signal processing system 100 is to reject clutter objects (grey) while at the same time identifying all target of interest objects (black).

Figure 3:
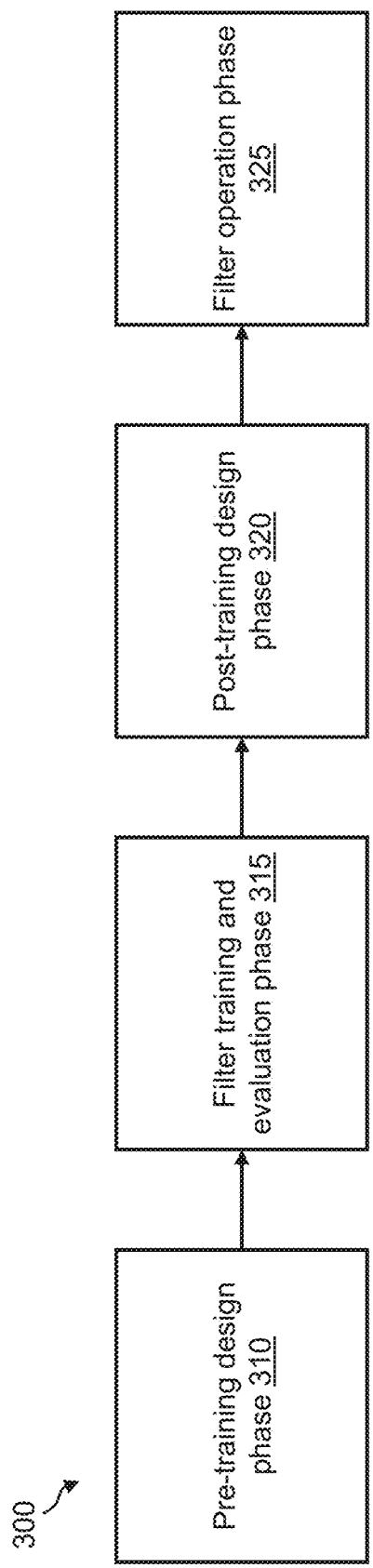
FIG. 3 shows an example of the general process overview of the presently disclosed bulk filter.

FIG. 3 is an example of the general development process overview 300 of the presently disclosed random decision forests bulk filter 110. The primary bulk filter algorithm, i.e., the random decision forests filter algorithm, is trained in an offline setting and operates in real time within the radar, hardware in the loop, or other evaluation/testing environments. There are four phases for the overall bulk filter development from initial design through operation—a pre-training design phase 310, then a filter training and evaluation phase 315, then a post-training design phase 320, and then a filter operation stage 325. The pre-training design phase 310 includes selection of training and evaluation data, initial features, and filter learning parameter ranges. The filter training and evaluation phase 315 executes the random decision forests training algorithm with candidate learning parameters over the training data and evaluates the performance over the evaluation data. The post-training design phase 320 includes two output modes (1) soft decisions that includes probabilistic decision confidence tuning, and (2) hard decisions that includes a time threshold determination and a decision threshold determination. Filter operation 325 involves integrating the resultant filter knowledge base and operational settings into the target platform for real time data processing and operation.

Figure 4:
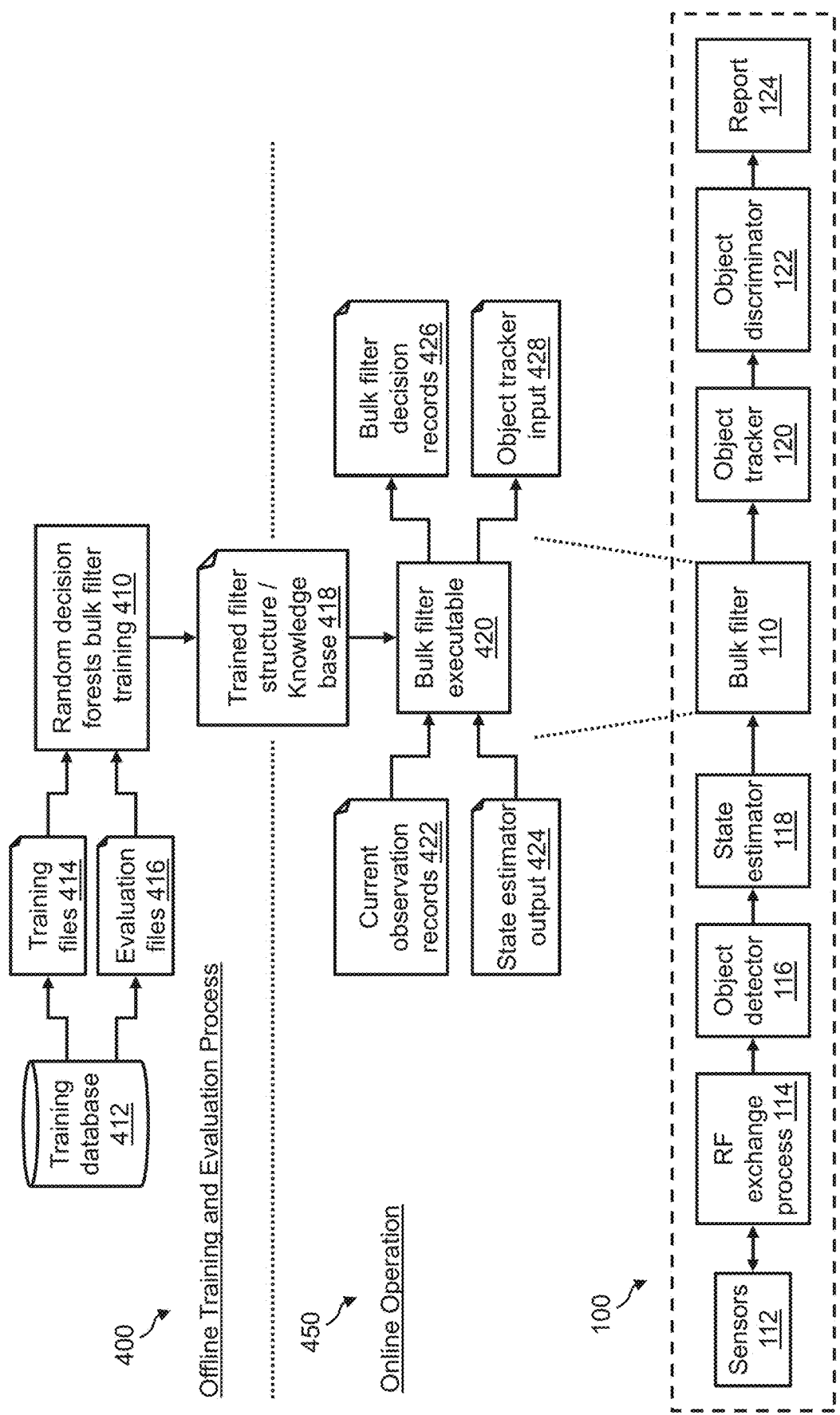
FIG. 4 illustrates a high level block diagram of an example of the offline training and online operation of the presently disclosed bulk filter application.

FIG. 4 is a high level block diagram of an example of an example offline training and evaluation process 400 and online operation 450 of the presently disclosed random decision forests bulk filter 110. The offline training portion of the random decision forests bulk filter 110 includes a random decision forests bulk filter training algorithm 410. The random decision forests bulk filter training algorithm 410 is informed by certain training files 414 and certain evaluation files 416 that are stored in a training database 412. The random decision forests bulk filter training algorithm 410 provides a trained filter structure/knowledge base 418 that informs a bulk filter executable 420 on how to distinguish targets of interest from clutter. A set of current observation records 422 from the state estimator 424 are applied to the bulk filter executable 420 as input and a set of object type decisions 426 (target of interest, $H_1$ or clutter, $H_0$) are output to object track 428. The trained filter structure/knowledge base, 418 is the result of the offline training portion 400 and is used by the executable 420 in the online operation portion 450 of the random decision forests bulk filter 110.

Referring now again to FIG. 1 through FIG. 4, a general overview of the presently disclosed random decision forests bulk filter 110 is as follows. During operation, the random decision forests bulk filter 110 processes measurement records for objects detected and state estimated by a high resolution radar (e.g., sensors 112). These input records are assigned a categorical label based on the patterns of information contained within the record. The output bulk filter categories are target of interest, $H_1$ or clutter, $H_0$ The feature set making up the input records consist of direct measurements native to the sensor as well as features extracted from the measurements (e.g., velocity and acceleration extracted from the rate of change in the position of an object).

Referring still to FIG. 1 through FIG. 4, a general overview of an example training and design of the presently disclosed random decision forests bulk filter 110 may proceed as follows. During training, the random decision forests bulk filter 110 is provided with input records that have been previously labeled with the true category, i.e., target of interest or clutter. In this supervised learning approach, past observations and known object labels are provided as a dataset for training the decision-making process of the random decision forests bulk filter 110. The datasets may consist of several scenarios that are distinguished by unique target interest types, relative position of objects, and the sensor placement relative to the observed objects. The main parameters governing the construction of the random decision forests bulk filter 110 are (1) the filter resolution factor, N, (2) random subspace dimensionally, m, and (3) the proportion, γ, of the input dataset that makes up the subsets used to train filter components. As the datasets vary through the inclusion of different combinations of scenarios or different sets of features, the best learning parameters may also vary. Accordingly, the invention provides an optimized, machine learning training system that performs the learning parameter optimization for a given training dataset and evaluation dataset. The evaluation dataset consists of object records that have had their true labels withheld and are used for performance evaluation of the trained filter optimization candidate.

Figure 5:
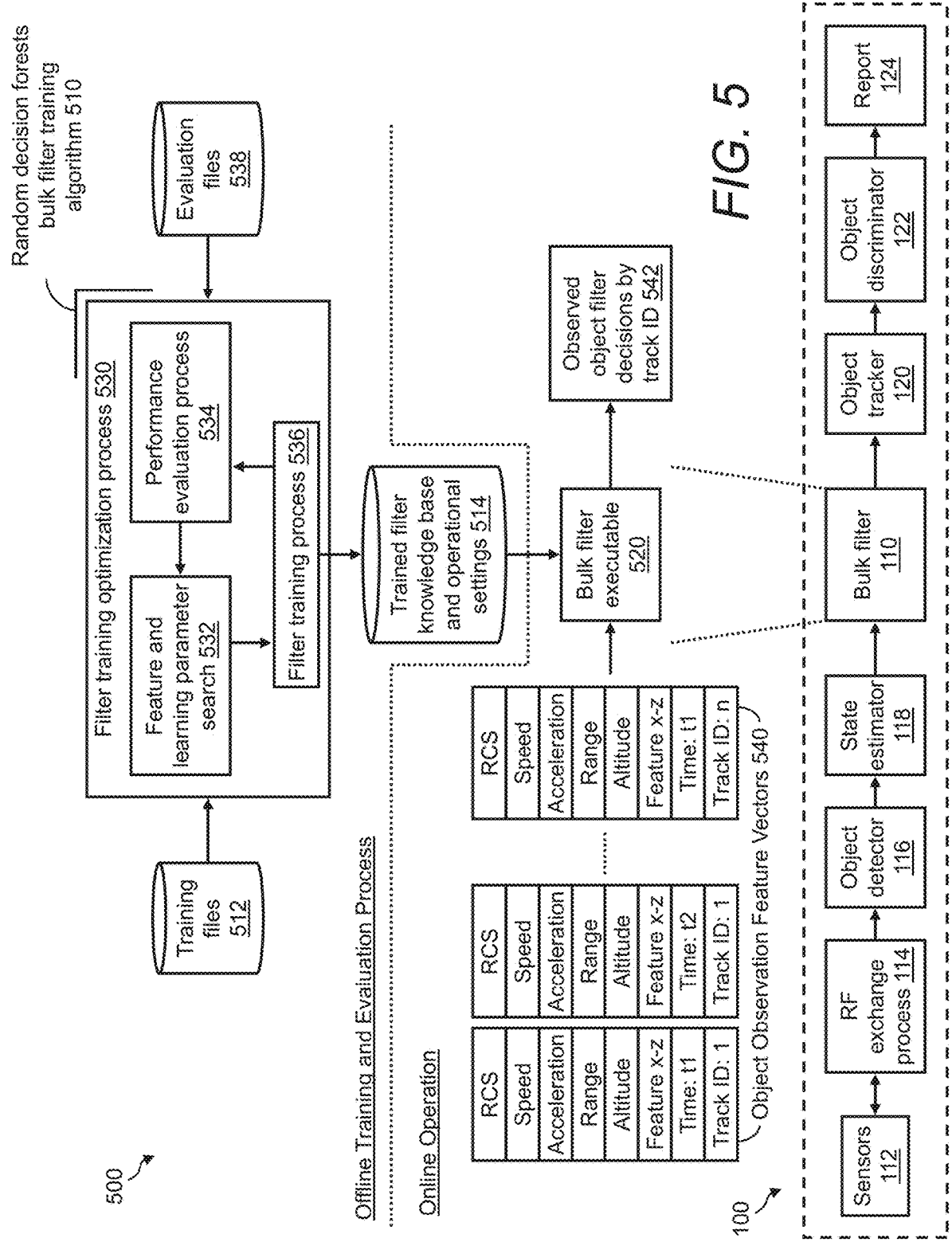
FIG. 5 illustrates a detailed block diagram of an example of the offline training and online operation of the presently disclosed bulk filter application.

FIG. 5 is a detailed block diagram of an example of the offline training and evaluation process 500 and online operation of the presently disclosed random decision forests bulk filter 110. FIG. 5 shows more detail as compared with the diagram shown in FIG. 4. For example, random decision forests bulk filter training algorithm 510 includes a filter training optimization process 530. Filter training optimization process 530 further includes a feature and learning parameter search 532, a performance evaluation process 534, a filter training process 536. Filter training process 536 is informed by feature and learning parameter search 532. Filter training process 536 informs performance evaluation process 534. Performance evaluation process 534 informs feature and learning parameter search 532. Further, filter training optimization process 530 is informed by training database 512 and an evaluation database 538.

The output of filter training process 536 supplies the trained filter knowledge base and operational settings 518. Then, the trained filter knowledge base and operational settings 518 are supplied to the bulk filter executable 520. Referring again to FIG. 4, more details of current observation records 422 and state estimator output 424 that feed bulk filter executable 420 are shown in FIG. 5. Namely, FIG. 5 shows sets of object observation feature vectors 540 feeding into feed bulk filter executable 520. Further, feed bulk filter executable 520 generates a set of object filter decisions by track ID 542.

The operational portion of the random decision forests bulk filter 110 consists of the executable application build (e.g., bulk filter executable 520) and the customizable trained filter knowledge base and operational settings metafiles (e.g., trained filter knowledge base and operational settings 518). The knowledge base and settings are determined through an offline training and evaluation process 500 that can be tailored to an expected encounter or generalized. The filter training can be performed in a fixed manner or optimized through search heuristics, such as Particle Swarm or genetic algorithm.

Figure 6:
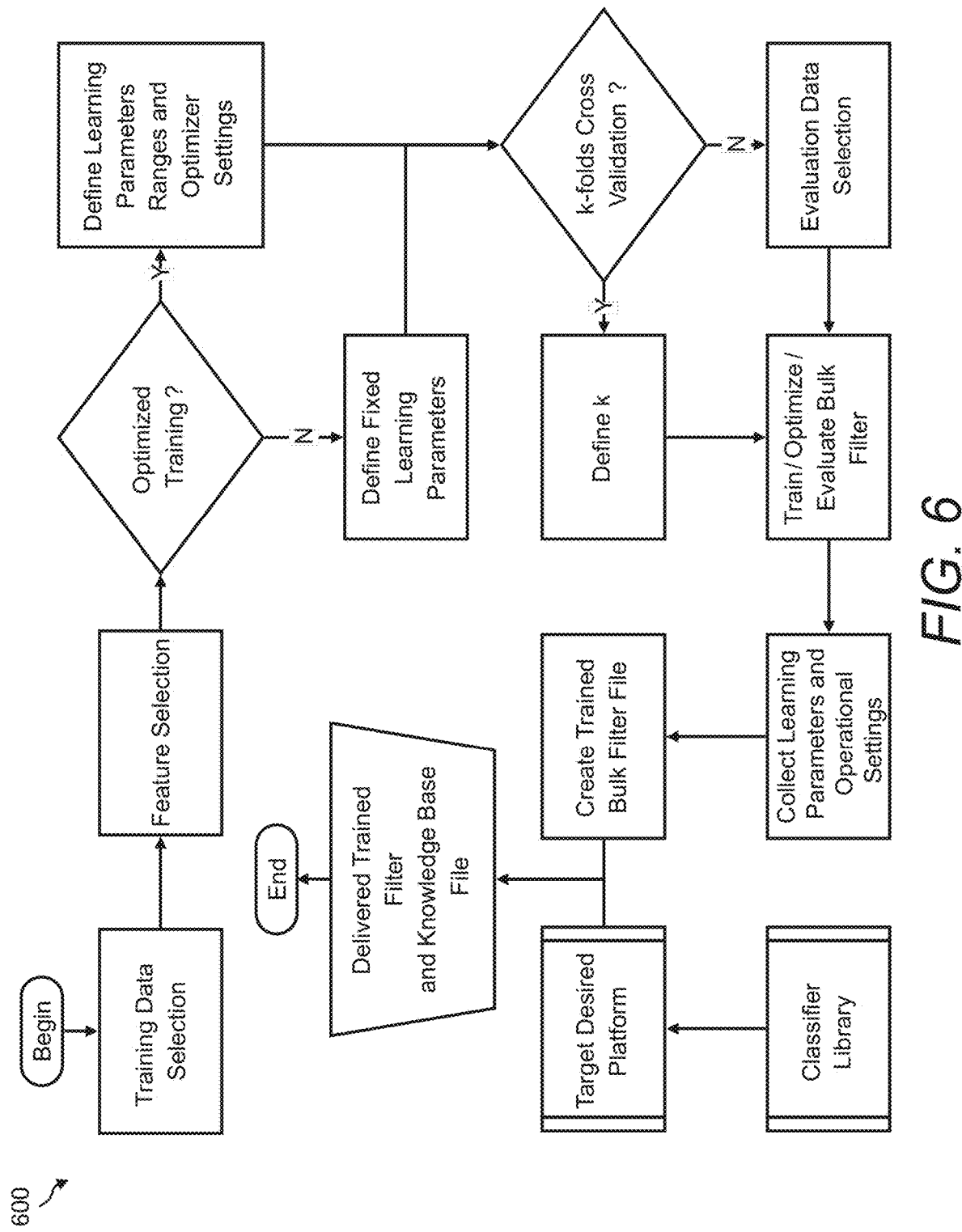
FIG. 6 illustrates a flow diagram of an example of a process of deploying the trained filter and operational settings presently disclosed bulk filter application.

FIG. 6 is a flow diagram of an example of a process 600 of deploying the presently disclosed random decision rests bulk filter 110.

Figure 7:
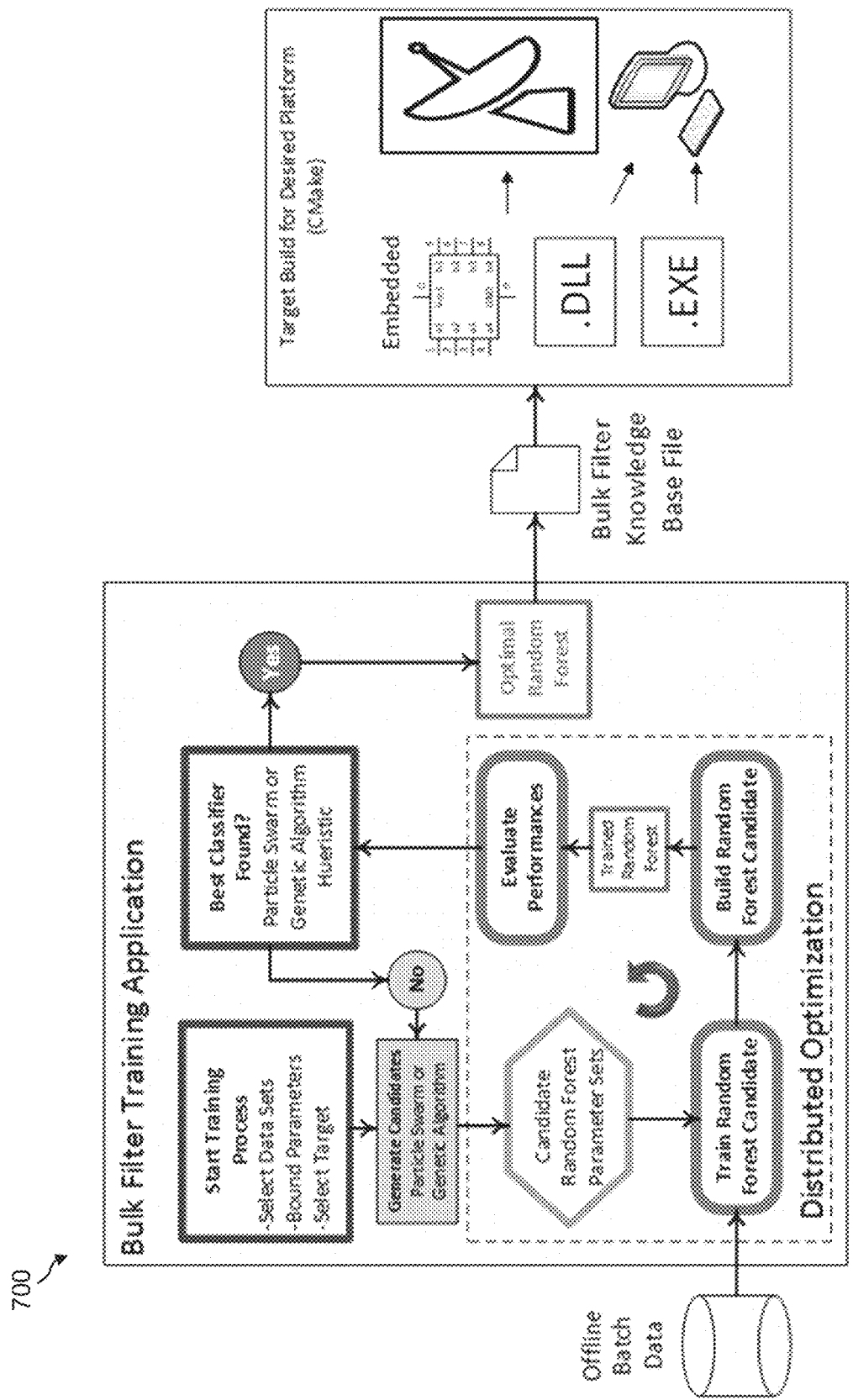
FIG. 7 illustrates a block diagram of the bulk filter optimization training process.

FIG. 7 is a block diagram of a random decision forests bulk filter optimization training process 700. In random decision forests bulk filter optimization process 700, there are certain learning parameters. Examples of learning parameters include (1) N, number of classification and regression trees (CART trees), (2) m, random subspace split dimension, (3) object time resolution, $\Delta t_{tr}$, (related to training sampling rate ηtr), (4) training bootstrap ratio, r, and (5) class boosting factors, λ0 and λ1 over range (0,1).

With respect to fixed training versus optimization training, during fixed training, the training set, cross validation approach, starting features, and bulk filter learning parameters are determined ahead of time. By contrast, during optimization training, a range of learning parameters are provided and a search is executed to find the best combinations leading to improved bulk filter performance. The Particle Swarm optimization heuristic may be used to perform the search, though several other search algorithm can be applied to the optimization such as exhaustive search, steepest descent, genetic algorithm, etc. The ranges of learning parameters should be determined during pre-training design in order to confine the search space. The optimization is constrained by the minimum $p_d$ and the output metrics are $p_{fa}$, decision threshold margin and bulk filter run time.

Figure 8:
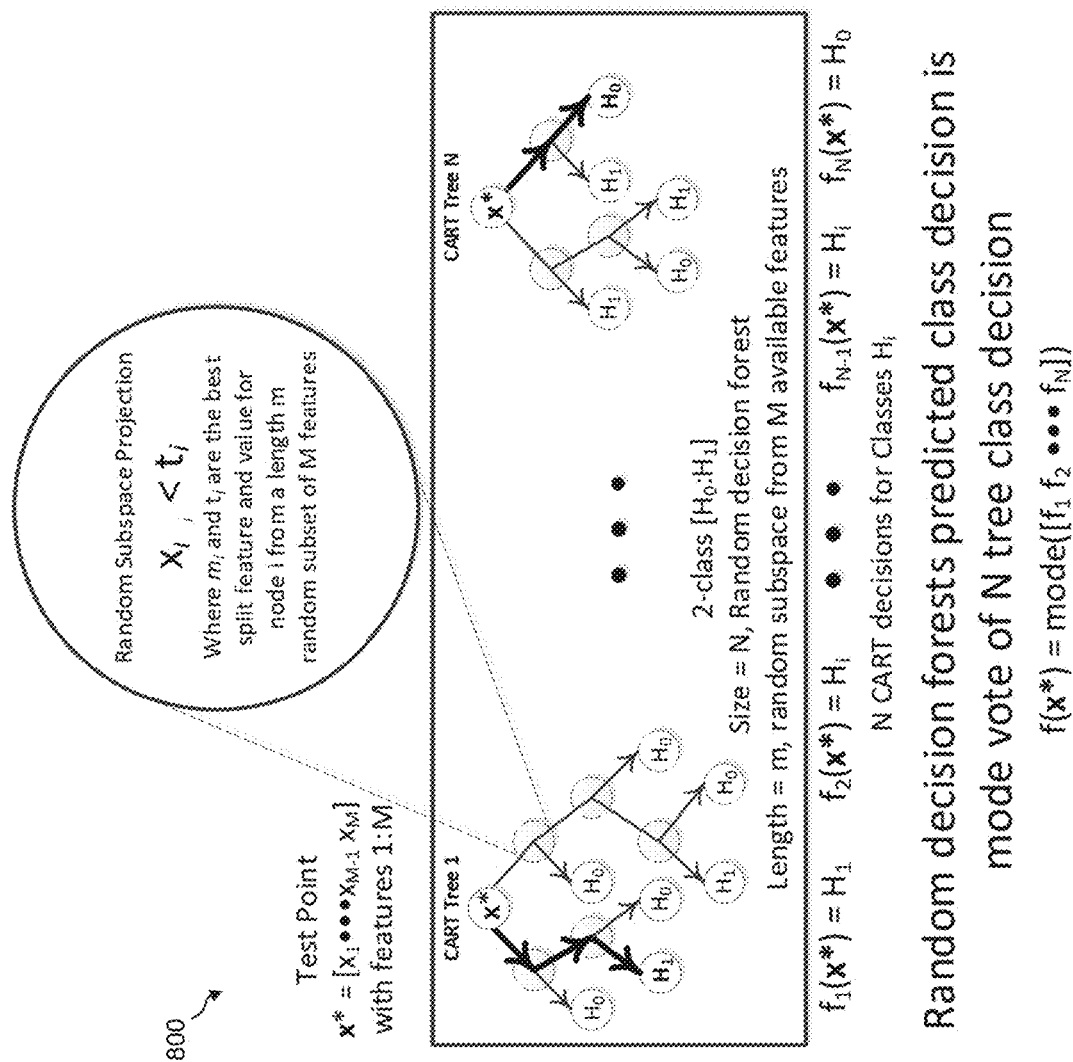

FIG. 8, FIG. 9A, and FIG. 9B show more details of the random decision forests algorithm that is the basis of the presently disclosed random decision forests bulk filter 110. Using the random decision forests concept, the random decision forests bulk filter 110 (1) provides exceptional classification performance and generalization, (2) is operationally fast, (3) provides fast training times, (4) is simple to understand, and (5) is less prone to over-fitting as compared to conventional filters.

Baseline Random Decision Forests Training Algorithm

Random decision forests is an ensemble learning method combining several Classification And Regression Tree (CART) "weak" learners to form a "strong" learner. FIG. 8 shows a graphical depiction 800 of random decision forests with N CART trees and random subspace dimensionality m. The input object observation feature vector has M initial features. The true nature of the objects are among two classes: 1) clutter and 2) target of interest.

The general concept of ensemble learning and bootstrap aggregation is that several weak classifiers can be combined to form a stronger classifier. With random decision forests, several CART classifiers are trained over different bootstrap data subsets (randomly sampled with replacement from the total input training dataset), where the number of samples in the subset is determined by γ. Each CART tree in the random decision forest is trained by first subsampling m features from the total feature set; of these m features the best single feature and value that separates to data minimizing classification error. This random subspace projection concept allows the CART trees to find the best input over a random subset of features as opposed to finding the best feature overall at each decision node, which can lead to overt raining. This process continues until pure endpoints are reached, for example if the parent node splits the data by placing all target of interest objects on one branch and all clutter objects on another branch, no further splitting can occur and each branch is assigned the category of the data points' labels. There is no pruning of the CART branches in the random decision forests algorithm as is the case in some CART implementations; pruning occurs when splits occur on very few data points, which for efficiency sake label the branch of the majority data point label at the cost of performance. Because of the different randomly selected datasets provided to each CART for training and the random subspace projection the N CART trees across the forest are more diverse and thus less prone to overfitting. During operation, an unlabeled data point is provided to each of the N trees in the forest. The terminal node location of the unlabeled point will be the estimated category for each tree. The final decision criterion of the random decision forest is the voting proportion of each class among all trees.

Key learning parameters of the baseline algorithm are as follows:

N—number of CART trees in forest
m—random subspace dimensionality
The training data characteristics are as follows:
M—total number of features (M features)
x—observation feature vector: size 1×M
S—size of training set (S observations, $X_s$)
X—training set matrix: size S×M
L—class label vector 0 or 1: size S×1 (S labels, Ls)
The two classes of objects are as follows:
$H_0$ Clutter; Ls=0
$H_1$—Target of interest; Ls=1.

The presently disclosed random decision forests bulk filter 110 includes baseline random decision forests offline supervised training (see FIG. 4). With respect to the baseline random decision forests offline supervised training, for each of the N CART trees (n): Randomly sample a bootstrap dataset from the entire training dataset with replacement. By default the bootstrap dataset sizes are equal to the original training dataset size. Sampling with replacement ensures that each tree is trained with a unique training subset.

For example, for each decision node in the CART tree:
1) Randomly select in features from the M total available features,
2) Choose the feature $m_i$ and value t that best splits the observations $x_s$ by class label $L_s$,
3a) Create child node $2i$ and branch all input data with $x_{s,mi} < t$ to the left,
3b) Create child node $2i+1$ and branch all input data $x_{s,mi} \geq t$ to the right,
4) If the branch data at child node is pure (same class label) create terminal node label 1,
5) If the branch data is impure create a new decision node and repeat step 1.

When all data arrives in terminal nodes, the CART training is complete.

Random decision forest CART trees can have terminal nodes with a single data point. Random decision forest CART trees are not "pruned" (combining terminal nodes with less than some pre-defined number of data points). A "trained" random decision forest consists of N data structures containing node IDs (i) and: corresponding selected feature (mi) split value ($t_i$) and children node IDs ($2i$ and $2i+1$) OR terminal node class label ($l_i$).

FIG. 8 shows multiple decision trees in a random decision forest. At each of the nodes the random decision forests bulk filter 110 randomly selects a subset of the available features and then chooses which one best splits the data. An ideal split would be the targets of interest objects sent down one branch and the clutter objects sent down another branch.

FIG. 9A shows a graphical depiction 900 of the random decision forests operation. For each new observation feature vector x*: apply observation vector to each CART tree input node i=1:

1) For trained split feature $m_i$ compare $x_{mi}$ to $t_i$,
1) Randomly select m features from the M total available features,
  1a) If $x_m < t_i$ send x* to the left (child node $2i$),
  1b) If $x_{mi} \geq t_i$ send x* to the right (child node $2i+1$),
2) If child node is a terminal node label x* as trained class label $l_i$: $f_n(x^*) = Hi$,
3) If child node is another decision node repeat step 1.
4) Continue until a terminal node is reached.

The final predicted class label for observation vector, x*, is the majority class label from the N CART trees (mode vote). FIG. 9B shows a graphical depiction 910 of random decision forests, wherein each observation feature vector is passed through all N CART trees on the random decision forest. The default classification decision rule is majority wins.

Modified Random Decision Forests Training Algorithm for Bulk Filtering

The presently disclosed random decision forests bulk filter 110 of signal processing system 100 supports custom random decision forests training. For example, a set of custom learning parameters includes (1) object time resolution, $\Delta t_{tr}$ (related to training sampling rate $\eta_{tr}$), (2) training bootstrap ratio, r, and (3) class boosting factors, $\lambda_0$ and $\lambda_1$ over range (0,1).

Radar observation records occur at e varying intervals as objects are scanned at different rates and radar systems have varying minimal time resolution. The object time resolution parameter, $\Delta t_{tr}$, was introduced to achieve sufficient training data sizes for decreasing training time and to minimize the effect of randomly varying radar process implications that prioritize objects to be scanned.

In one example, each observation record in the training input set uses the following format: [t OID x], where the values t (timestamp) and OD (tracked object ID) are concatenated with the object's feature vector, x. As records are associated by OID each object set is resampled to the desired $\Delta t_{tr}$. The training set size S, is determined by the total number or records remaining.

Each CART tree is grown from a unique bootstrap training set of size S'×M where S'=ceil(rS); the ceiling function, ceil(●) rounds the input value up to the nearest integer.

The bootstrap data is sampled from each class at different rates, $\lambda_0$ and $\lambda_1$, allowing for controlled prior class probabilities of the data being provided to each CART. The default setting: $\lambda_0 = p(H_0)$ and $\lambda_1 = p(H_1)$ represents uniform sampling according to the input data empirical class distributions $p(H_0)$ and $p(H_1)$. Because the clutter objects often far outnumber the target of interest objects $\lambda_1$ is usually set to a value much greater than $\lambda_0$ so that the target values are oversampled or "boosted". The expected number of samples from each class is $S'\lambda_0$ and $S'\lambda_1$ for class 0 (clutter objects) and class 1 (targets of interest) respectively.

Further, the presently disclosed random decision forests bulk filter 110 of signal processing system 100 supports custom random decision forests evaluation. Namely, the evaluation step involves applying data not used in the training process to the bulk filter in order to determine the operational settings that best meet performance goals. Certain custom operational parameter settings are determined during evaluation. The custom operational settings include (1) object resolution, $\Delta t_{eo}$ (related to evaluation/operation resampling rate $\eta_{eo}$), (2) decision fusion time threshold $\gamma_T$ (related to number of observations numObs), and (3) decision threshold $\gamma_{DS}$.

With respect to (1) object time resolution, $\Delta t_{eo}$, each object ID (OD) data input stream is resampled so that the observation vectors ($x_t$) applied to the bulk filter occur on $\Delta t_{eo}$ time boundaries ($\Delta t_{eo}$ and $\Delta t_{tr}$ can be different).

Rather than using the default classification rule (mode vote), the the proportion of trees that have voted for class $1(H_1)$ i.e.

$$ds_t = \frac{1}{N} \sum f_n(x_t),$$

where $f_n(x_t)=1$ if $l=H_1$ and $f_n(x_t)=0$ if $l=H_0$, where l is the terminal node label for the $n^{th}$ CART tree for the input feature vector $x_t$.

The per observation $ds_t$ values are averaged over a fixed number of observations (numObs) to form the aggregated decision statistic value, DS, as a form of decision fusion.

With respect to the custom operational parameters (2) decision fusion time threshold $\gamma_T$ and (3) decision threshold $\gamma_{DS}$—The decision fusion time threshold, $\gamma_T$, is determined by the number of individual $ds_t$ values to average (numObs) and evaluation/operation time resolution such that $\gamma_T=\Delta t_{eo}\times$ numObs The decision threshold $\gamma_{DS}$ is the cutoff value for determining which class an object belongs to. For each object ID data stream, the DS values are compared to $\gamma_{DS}$ at the decision fusion time threshold (after numObs have been averaged). If $DS<\gamma_{DS}$ then the object predicted class is $H_0$, if $DS\geq\gamma_{DS}$ the object predicted class is $H_1$.

The decision threshold $\gamma_{DS}$ and decision fusion time threshold $\gamma_T$ and numObs are determined through a receiver operating characteristics (ROC) approach over the evaluation data set. This approach determines the minimum probability of false alarm $p_{fa}$ conditioned on a minimum probability of detection $p_d$.

Further, the presently disclosed random decision forests bulk filter 110 of signal processing system 100 supports a pre-training process. For example, the pre-training process includes (1) training data selection, (2) feature selection, and (3) learning parameters.

With respect to training data selection, there is:
1) Custom training data selection—Use of a priori information, known target of interest behaviors, previous recorded observations and intelligence to select a training data set for a specific mission (loadset);
2) General training data selection—Building the "best" bulk filter over all available data for generalization performance,
3) Cross-validation—Once the training data is selection k-folds cross validation can be used so at a subset of the training data is used for training and another subset is withheld for evaluation.

With respect to feature selection, there is:
1) Features intrinsic to sensor
2) Features derived from aggregating measurements over time
3) Features derived from state estimation
4) Features derived from operations performed on the above
5) Features down-selected from feature importance studies With respect to learning parameters, there is:
1) N, number of CART Trees;
2) m, random subspace split dimension,
3) Object time resolution, $\Delta t_{tr}$ (related to training sampling rate $\eta_{tr}$)'
4) Training bootstrap ratio, r,
5) Class boosting factors, $\lambda_0$ and $\lambda_1$ over range (0,1).

Further, the presently disclosed random decision forests bulk filter 110 of signal) processing system 100 supports a post-training process. For example, the post-training process includes (1) evaluation data selection and (2) operational settings.

With respect to filter evaluation, there is:
1) k-bolds cross validation—the selected the training data file observation records are separated into k random partitions, k-1 partitions are used for training the filter and the remaining partition is used to evaluate the trained filter.
2) Custom evaluation data—The selection of specific test cases to determine the generalization performance of the trained bulk filter.

With respect to operational settings, there is:
1) Object time resolution, $\Delta t_{eo}$ (related to evaluation/operation sampling rate $\eta_{eo}$),
2) Decision fusion time threshold $\gamma_T$ (related to number of observations numObs),
3) Decision threshold $\gamma_{DS}$.

With respect to operation, there is:
1) Observation vectors $x_t$ per object ID; input by state estimator
2) Per observation decision statistic $ds_t$; assigned by filter executable
3) Aggregated decision statistic $DS_{numObs}$; fused during post decision processing
4) Per object ID output class decision, H0 (clutter) or H1 (target of interest); output to object tracker FIG. 10 shows a summary table 1000 of learning parameters and operational settings of the presently disclosed random decision forests bulk filter 110.

Figure 11:
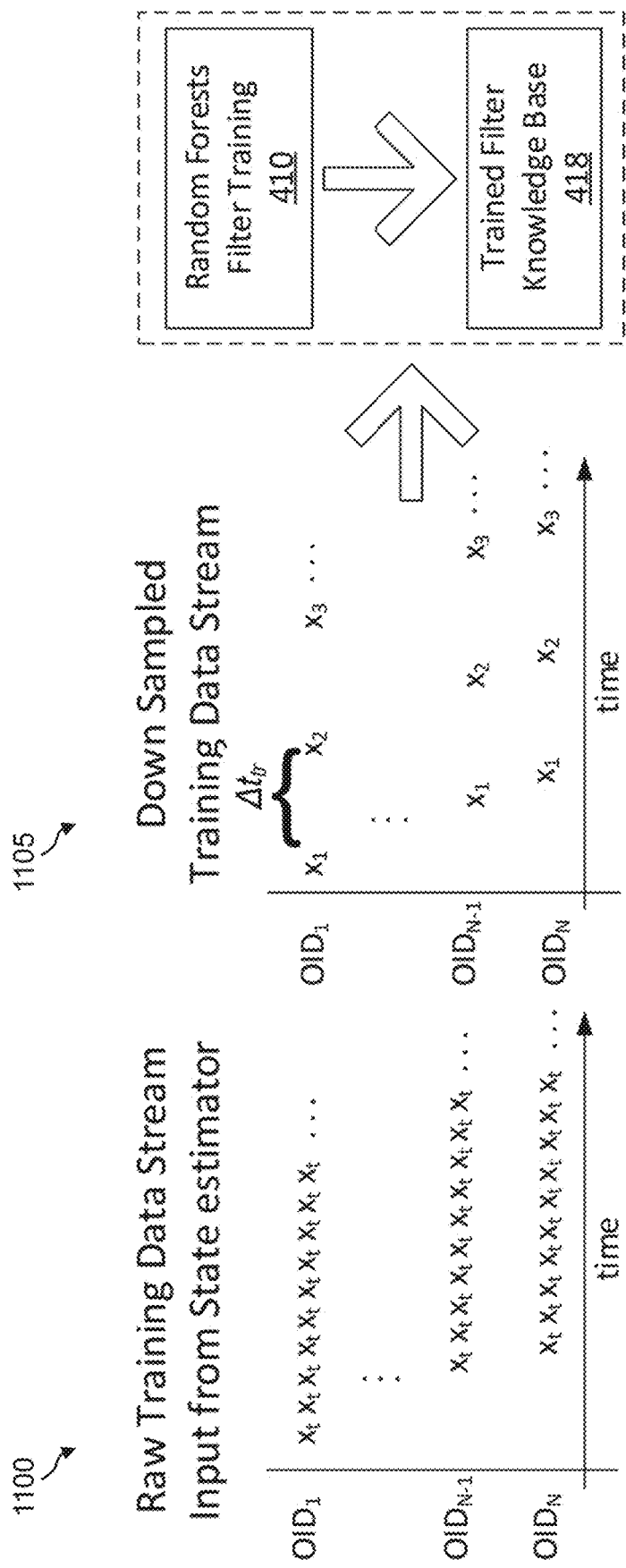
FIG. 11 shows an example of the training data processing of the presently disclosed bulk filter application.

Referring now to FIG. 11 is an example of the training data processing of the presently disclosed random decision forests bulk filter 110. Namely, a plot 1100 shows the raw training data stream, a plot 1105 shows the down-sampled training data stream. Each object ID record set in the training data is resampled in time to $\Delta_{tr}$. Each object ID record can start at varying times according to the radar's native time resolution. The down-sampled data is sampled at a constant rate though each record timestamp can vary by any value, i.e., the raw observation times and down-sampled times are not aligned. The true timestamp values may not be perfectly spaced on $\Delta_{tr}$ where the nearest time sample from the raw data stream is associated. The down-sampled training data is used by the random decision forests training process 410 to generate the trained filter knowledge base 418.

Figure 12:
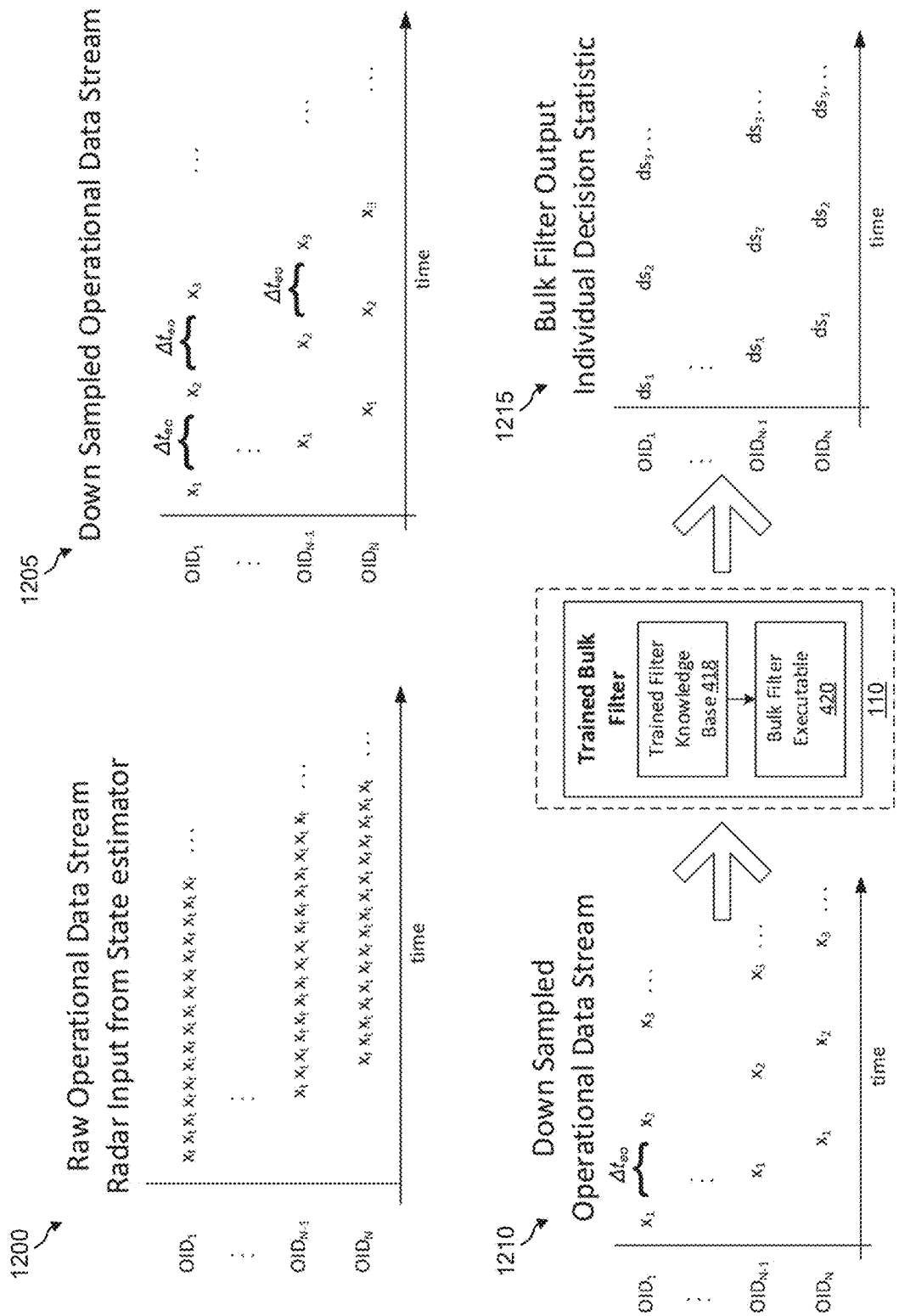
FIG. 12 shows an example of the operational data processing of the presently disclosed bulk filter application.

Referring now to FIG. 12 is an example of the operational data processing of the presently disclosed random decision forests bulk filter 110. With respect to plot 1200 of the raw operational data stream and plot 1205 of the down-sampled operational data stream, each operational data object defined by an object ID (OID) observation feature vectors $(x_t)$ are resampled to a time resolution of $\Delta t_{eo}$. With respect to plot 1210 of the down-sampled operational data stream and plot 1215 of the bulk filter individual decision statistic output, each evaluation/operational data object defined by an object ID (OID) observation feature vectors $(x_t)$ is resampled to $\Delta t_{eo}$, before presentation to the random decision forests bulk filter 110. The trained random decision forests bulk filter consists of the trained filter knowledge base 418 and the bulk filter executable. Each input feature vector, $x_t$, yields a bulk filter output decision statistic $(ds_t)$.

Figure 13:
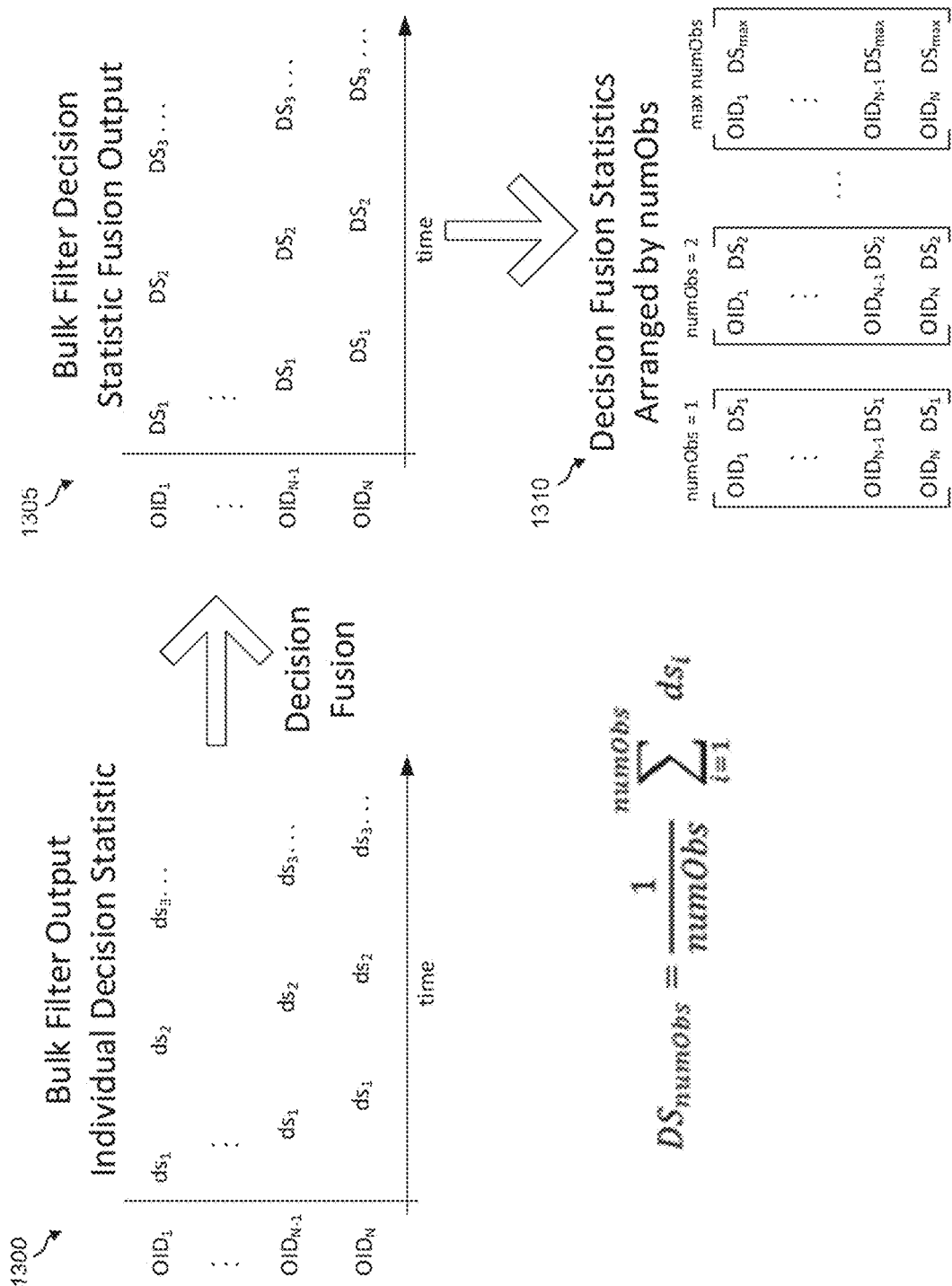
FIG. 13 shows an example of the output data and decision fusion processing of the presently disclosed bulk filter application.

Referring now to FIG. 13 is an example of the output data processing of the presently disclosed random decision forests bulk filter 110. Namely, a plot 1300 shows the bulk filter individual decision statistic output, another plot 1305 shows the bulk filter decision statistic fusion output, another plot 1310 shows the decision fusion statistics arranged by number of observations (numObs).

With respect to plot 1200 and plot 1205, per observation decision statistics are averaged over variable length time/observation windows. Within the decision fusion process, the individual observation decision statistics are cumulatively aggravated over the maximum number of observations in the down-sampled space. Currently, the fusion rule averages the ds values, though the max, min, median or other aggregation rules can be applied over the sliding windows in a cumulative manner.

With respect to plot 1310, the decisions fusion sets varying by numObs are analyzed using receiver operating characteristic (ROC) probability of detection and false alarm to determine the operational settings: numObs (decision time) and $\gamma_{DS}$ (decision threshold) values.

Figure 14:
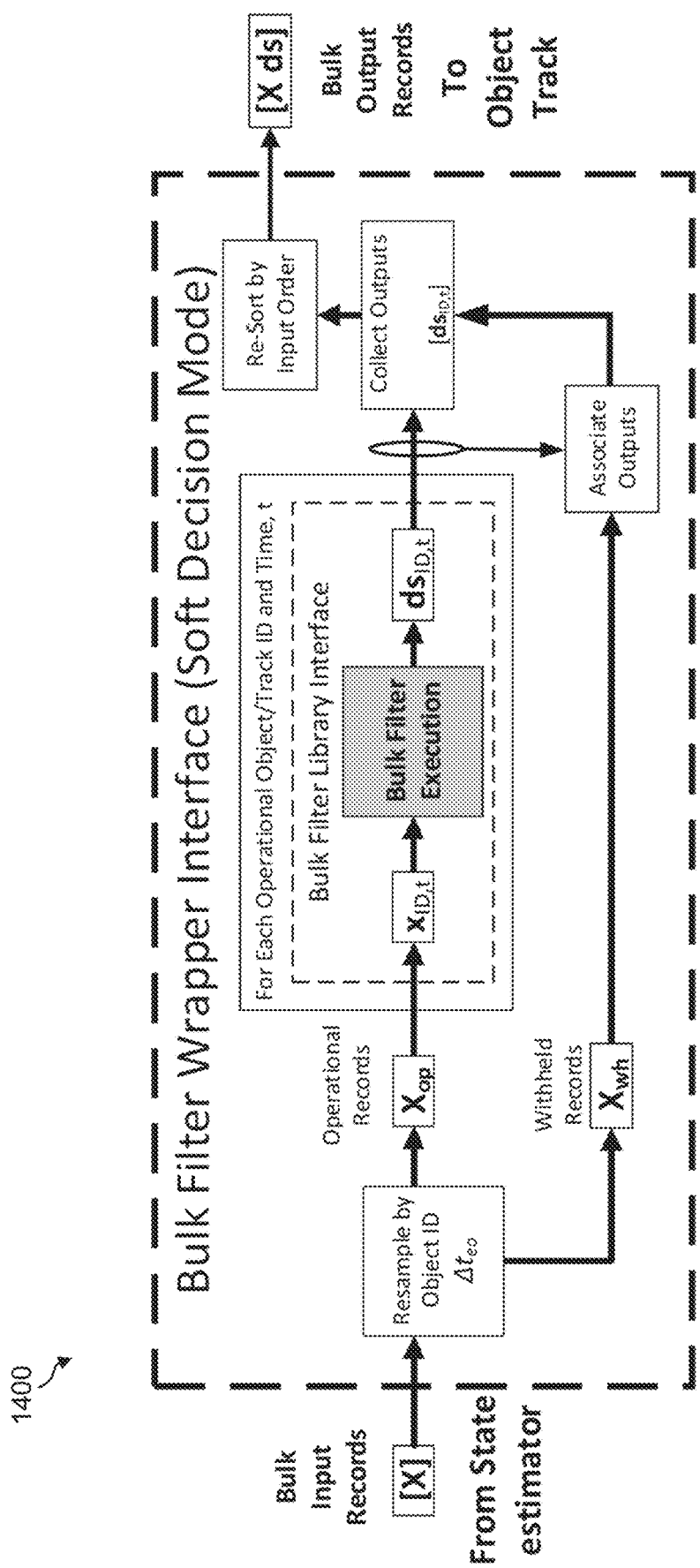
FIG. 14 illustrates a block diagram of an example of the bulk filter input/output interface in bulk filter soft decision mode.

Further, the presently disclosed random decision forests bulk filter 110 of signal processing system 100 supports custom random decision forests operation. For example, the random decision forests bulk filter 110 can provide a soft decision output as well as a hard decision output. For example and referring now to FIG. 14, a block diagram is presented of an example of a random decision forests bulk filter operation 140, wherein the presently disclosed random decision forests bulk filter 110 is in soft decision mode. In soft decision mode, radar input records are down-sampled to the operational resolution and passed to the random decision forests bulk filter 110 by object ID. Each operational record is processed and a corresponding soft decision statistic is yielded. Object records that were withheld from operation are given the decision statistic (ds) value of the nearest operational point that was processed by the bulk filter for that object ID.

FIG. 15 shows a table 1500, which shows an example of the soft decision output for two object ID record sets provided over a 1 second bulk input window at a raw data stream rate of 0.05 sec. The greyed out records were withheld from the bulk filter ($\Delta t_{eo}$=0.1 s) and receive the ds value from its nearest neighbor. With respect to the soft decision output, rather than declaring the class membership for each object ID (OID), the $ds_t$ values are continuously output. The $ds_t$ values can be interpreted as the degree of belief that the object ID belongs to class 1.

Figure 16:
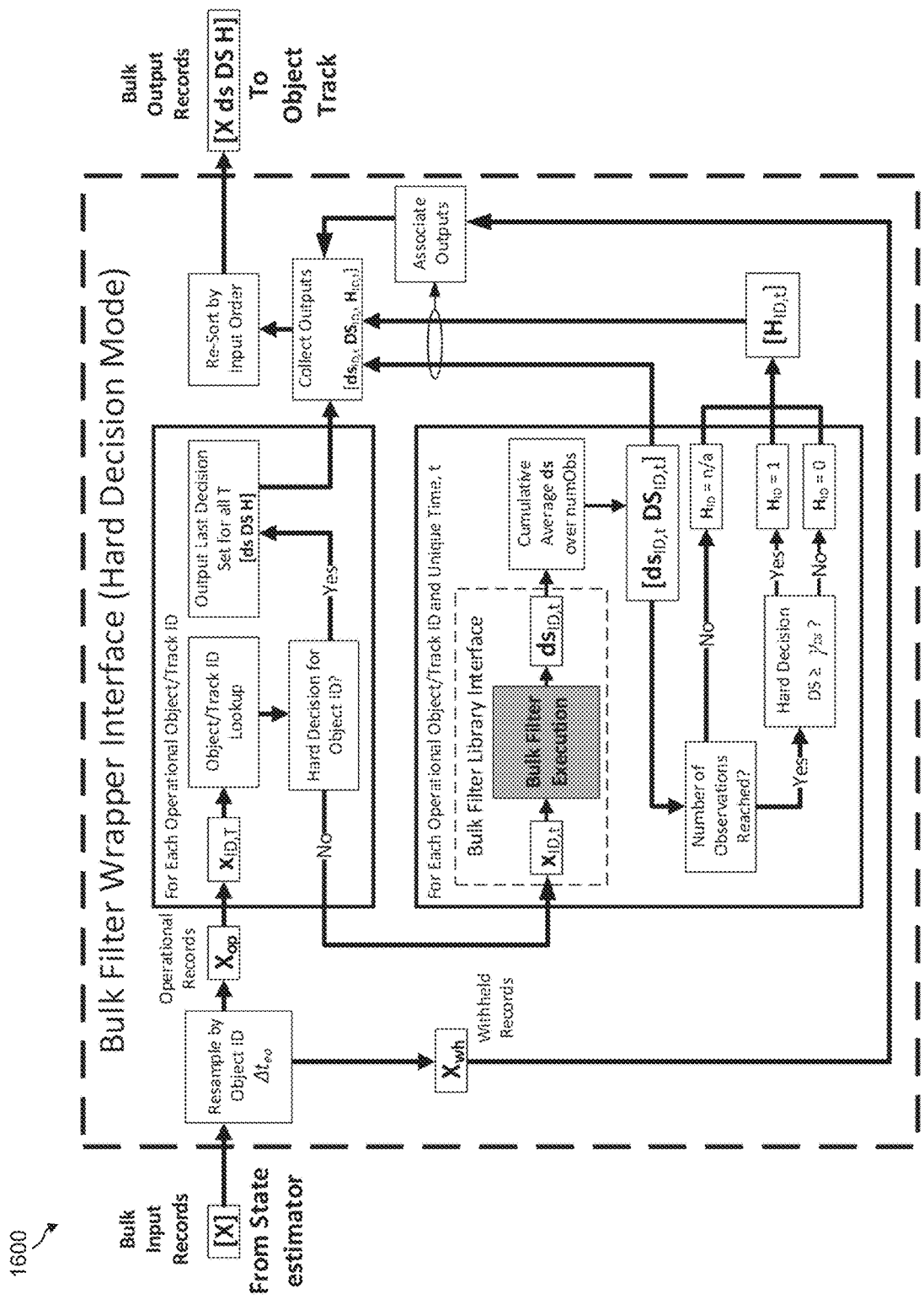
FIG. 16 illustrates a block diagram of an example of the bulk filter input/output interface in bulk filter hard decision mode.

Referring now to FIG. 16 is a block diagram of an example of a random decision forests bulk filter operation 1600, wherein the presently disclosed random decision forests bulk filter 110 is in hard decision mode. In hard decision mode, radar input records are down-sampled to the operational resolution and passed to the random decision forests bulk filter 110 by object ID. If an object ID record set has previously reached the number of observations setting and a hard decision has already been made, the previous results are recalled and output for the object in question. Objects that have already been passed to object tracker 120 as target of interest objects cannot be re-labeled and will continue to be processed identically each time it is provided to the random decision forests bulk filter 110. Objects that have been declared clutter can be re-visited. Before an object reaches numObs, each operational record is processed and a corresponding soft decision statistic is yielded. The soft decision statistics are averaged over the specified numObs and decision time duration operational settings. Once the desired number of observations has been reached the final hard decision is made and passed to the output. Object records that were withheld from operation are given the decision statistic (ds), decision fusion statistic (DS) and hard decision (H) values of the nearest operational point that was processed by the bulk filter for that object ID.

FIG. 17 shows a table 1700, which shows an example of the hard decision output for object ID record sets provided over a 1 second bulk input record set at a raw data stream rate of 0.05 sec. The greyed out records were withheld from the bulk filter ($\Delta t_{eo}$=0.1 s) and receive the ds value from its nearest neighbor. In this example the decision fusion time threshold $\gamma_{T, is}$ 0.4 seconds and the decision fusion statistic threshold, $\gamma_{DS, is}$ 0.5. For object ID 27, at time 0.4 s a hard decision is male and all subsequent outputs are identical, after time 0.07 s OID 27 no longer persists. Object ID 35 does not appear until time 0.3 s, therefore its decision e is not until e 0.7 s where the subsequent outputs are identical for as long as the object persists, in this example object 35 is still present at the end of the bulk window.

With respect to the hard decision output, during operation, trained bulk filter pre-processor collects the input data stream provided by state estimator 118 of signal processing system 100. For each unique object ID, the initial timing value, t, is set. For each object ID's observation vector arriving at time $t+k\Delta t_{eo}$, $x_t$ is passed to the N CART trees and the corresponding output labels are obtained from each tree and the $$ds_t = \frac{1}{N} \sum f_n(x_t)$$

value is stored for $t+k\Delta t_{eo}$. After the specified number of observations have been passed to the bulk filter k=numObs ($k\Delta t_{eo}=\gamma_T$) the $ds_t$ values are averaged to yield the aggregated decision statistic DS. DS is compared to $\gamma_{DS}$ to determine the predicted class, if DS≥$\gamma_{DS}$ then OID belongs to class $H_1$, otherwise it is class $H_0$.

In summary and referring again to FIG. 1 through FIG. 17, the presently disclosed random decision forests bulk filter 110 of signal processing system 100 is a high resolution radar bulk filter for clutter rejection that is based on the random decision forests algorithm.

The random decision forests bulk filter 110 requires labeled training data from past observations or simulated data in order to learn the target of interest object and clutter object characteristics over the selected feature space. The selection of the training data, evaluation data and input features should be done with care, as they determine the knowledge base of the bulk filter.

The learning parameters of the bulk filter training can be set ahead of time or determined through a multi-objective hyper-parameter search using particle swarm optimization. The operational settings that control when and how the random decision forests bulk filter 110 declares objects to belong to the target of interest class or clutter class are determined during the evaluation process at post-filter training.

As the random decision forests bulk filter 110 operates, it can be selected to operate in two modes. The first mode is hard decision mode, where the class label ($H_0$ or $H_1$) are output for each input object ID data stream. The second mode is soft decision mode, where the individual $ds_t$ values are provided corresponding to each input.

What is claimed is:
1. A method for resolving targets of interest from clutter objects in radar data, the method comprising:
    detecting a plurality of unknown objects in radar observation data;
    estimating one or more features of each of the unknown objects, using the estimated features to associate unknown objects across multiple observations of the radar observation data, and assigning identifiers to associated objects;

filtering the associated objects so as to reject clutter objects and pass targets of interest, using a classification and regression tree (CART) ensemble classification algorithm; and performing object tracking on the targets of interest passed by the CART ensemble classification algorithm.

2. The method of claim 1, wherein the CART ensemble classification algorithm is a bootstrap aggregated CART ensemble classification algorithm.

3. The method of claim 2, wherein the CART ensemble classification algorithm is a random decision forests classification algorithm.

4. The method of claim 1, wherein the CART ensemble classification algorithm classifies objects into only clutter objects and targets of interest.

5. The method of claim 1, wherein said detecting, estimating, and filtering are performed in real time, with respect to the radar observation data.

6. The method of claim 1, wherein the method comprises performing the object tracking on the targets of interest in real-time.

7. The method of claim 1, wherein the method further comprises performing object discrimination on the targets of interest passed by the CART ensemble classification algorithm, the object discrimination classifying targets of interest according to a plurality of pre-defined object types.

8. The method of claim 1, wherein the method further comprises, prior to said detecting, estimating, and filtering, training the CART ensemble classification algorithm using a training data stream down-sampled from a raw training data stream, the raw training data stream having a time resolution corresponding to a native resolution of the radar observation data and the down-sampled training data stream having a coarser time resolution than that of the raw training data stream.

9. A signal processing system for resolving targets of interest from clutter objects in radar data, the signal processing system comprising processing circuitry configured to:

detect a plurality of unknown objects in radar observation data;

estimate one or more features of each of the unknown objects, using the estimated features to associate unknown objects across multiple observations of the radar observation data, and assigning identifiers to associated objects;

filter the associated objects so as to reject clutter objects and pass targets of interest, using a classification and regression tree (CART) ensemble classification algorithm; and perform object tracking on the targets of interest passed by the CART ensemble classification algorithm.

10. The signal processing system of claim 9, wherein the CART ensemble classification algorithm is a bootstrap aggregated CART ensemble classification algorithm.

11. The signal processing system of claim 10, wherein the CART ensemble classification algorithm is a random decision forests classification algorithm.

12. The signal processing system of claim 7, wherein the CART ensemble classification algorithm classifies objects into only clutter objects and targets of interest.

13. The signal processing system of claim 9, wherein the one or more processing circuits are configured to perform the detecting, estimating, and filtering in real time, with respect to the radar observation data.

14. The signal processing system of claim 9, wherein the one or more processing circuits are configured to perform the object tracking on the targets of interest in real-time.

15. The signal processing system of claim 9, wherein the one or more processing circuits are configured to perform object discrimination on the targets of interest passed by the CART ensemble classification algorithm, the object discrimination classifying targets of interest according to a plurality of pre-defined object types.

16. The signal processing system of claim 9, wherein the one or more processing circuits are further configured to train the CART ensemble classification algorithm using a training data stream down-sampled from a raw training data stream, the raw training data stream having a time resolution corresponding to a native resolution of the radar observation data and the down-sampled training data stream having a coarser time resolution than that of the raw training data stream.

* * * * *

UNITED STATES PATENT AND TRADEMARK OFFICE
CERTIFICATE OF CORRECTION

| | | |
|---|---|---|
| PATENT NO. | : 10,908,261 B2 | Page 1 of 1 |
| APPLICATION NO. | : 16/183372 | |
| DATED | : February 2, 2021 | |
| INVENTOR(S) | : Eric Brandon Fails et al. | |

It is certified that error appears in the above-identified patent and that said Letters Patent is hereby corrected as shown below:

In the Specification

In Column 1, Line 5, insert, prior to the header currently appearing on this line:
-- STATEMENT REGARDING GOVT. RIGHTS
This invention was made with Government support under Contract No. HQ0147-14-C-7049, awarded by Missile Defense Agency (MDA). The Government has certain rights in the invention. --

Signed and Sealed this
Fifth Day of March, 2024

Katherine Kelly Vidal
*Director of the United States Patent and Trademark Office*